(12) United States Patent
Chu

(10) Patent No.: US 11,308,012 B2
(45) Date of Patent: Apr. 19, 2022

(54) ADAPTER AND SIGNAL TRANSMISSION METHOD THEREOF

(71) Applicant: Qisda Corporation, Taoyuan (TW)

(72) Inventor: Li-Kuei Chu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/827,659

(22) Filed: Mar. 23, 2020

(65) Prior Publication Data

US 2020/0356506 A1  Nov. 12, 2020

(30) Foreign Application Priority Data

May 7, 2019 (CN) .......................... 201910374022.7

(51) Int. Cl.
*G06F 13/38* (2006.01)
*G06F 13/40* (2006.01)

(52) U.S. Cl.
CPC ........ *G06F 13/382* (2013.01); *G06F 13/4068* (2013.01); *G06F 2213/0042* (2013.01); *G06F 2213/3812* (2013.01)

(58) Field of Classification Search
CPC .................................................. G06F 13/4282
See application file for complete search history.

(56) References Cited

U.S. PATENT DOCUMENTS

| 7,839,409 | B2 * | 11/2010 | Noorbakhsh | G09G 5/006 345/531 |
| 8,886,849 | B2 * | 11/2014 | Golembeski | G06F 13/4221 710/14 |
| 9,652,351 | B2 * | 5/2017 | Srivastava | G06F 13/4072 |

FOREIGN PATENT DOCUMENTS

| CN | 103389955 A | 11/2013 |
| CN | 204631855 U | 9/2015 |

OTHER PUBLICATIONS

Office action of counterpart application by SIPO dated May 28, 2020.

* cited by examiner

*Primary Examiner* — Henry Tsai
*Assistant Examiner* — Juanito C Borromeo

(57) ABSTRACT

An adapter configured to transmit signal of the first electronic device to the second electronic device is provided. The adapter includes a first USB type-C controller, a second USB type-C controller and pleural USB type-C data transmission lanes connected to the second USB type-C controller and the first USB type-C controller. The second USB type-C controller is configured to: (1) obtain a first transmission specification supported by the second electronic device; and (2) transmit the first transmission specification to the first USB type-C controller. The first USB type-C controller transmits the first transmission specification to the first electronic device. The first electronic device transmits a control command to the first USB type-C controller according to the first transmission specification. The first USB type-C controller further uses a corresponding number of data transmission lanes according to the control command.

20 Claims, 6 Drawing Sheets

ADAPTER AND SIGNAL TRANSMISSION METHOD THEREOF

This application claims the benefit of People's Republic of China application Serial No. 201910374022.7, filed on May 7, 2019, the subject matter of which is incorporated herein by reference.

BACKGROUND OF THE INVENTION

Field of the Invention

The invention relates in general to an adapter and a signal transmission method thereof, and more particularly to a universal serial bus (USB) type-C adapter and a signal transmission method thereof.

Description of the Related Art

To provide high-speed USB 3.0 transmission, a conventional adapter normally uses only a few USB type-C data transmission lanes. Thus, even when the data volume inputted to the input end of the adapter is larger than the data volume of the few USB type-C data transmission lanes (for example, 4K resolution display data is inputted), the 4K specification display screen coupled to the output end of the adapter still cannot be lit on because the adapter uses only a few USB type-C data transmission lanes.

SUMMARY OF THE INVENTION

The invention relates to an adapter and a signal transmission method thereof capable of resolving the above problems.

According to an embodiment of the present invention, an adapter configured to transmit signal of a first electronic device to a second electronic device is provided. The adapter includes a first USB type-C controller, a second USB type-C controller and pleural USB type-C data transmission lanes connected to the second USB Type-C controller and the first USB Type-C controller. The first USB type-C controller electrically couples the first electronic device. The second USB type-C controller electrically couples the second electronic device. The second USB type-C controller is configured to: (1) obtain a first transmission specification supported by the second electronic device; and (2) transmit the first transmission specification to the first USB type-C controller. The first USB type-C controller transmits the first transmission specification to the first electronic device. The first electronic device transmits a control command to the first USB type-C controller according to the first transmission specification. The first USB type-C controller further uses a corresponding number of data transmission lanes according to the control command.

According to another embodiment of the present invention, a signal transmission method for an adapter connecting a first electronic device to a second electronic device is provided. The adapter includes a first universal serial bus (USB) type-C controller, a second USB type-C controller, a plurality of USB type-C data transmission lanes connecting the first USB type-C controller to the second USB type-C controller. The signal transmission method includes following steps. A first transmission specification supported by the second electronic device is obtained by the second USB type-C controller; the first transmission specification to the first USB type-C controller is transmitted by the second USB type-C controller; the first transmission specification to the first electronic device transmitted by the first USB type-C controller; a control command to the first USB type-C controller transmitted by the first electronic device according to the first transmission specification; and a corresponding number of data transmission lanes is used by the first USB type-C controller according to the control command.

The above and other aspects of the invention will become better understood with regards to the following detailed description of the preferred but non-limiting embodiment(s). The following description is made with reference to the accompanying drawings.

DETAILED DESCRIPTION OF THE INVENTION

Figure 1:
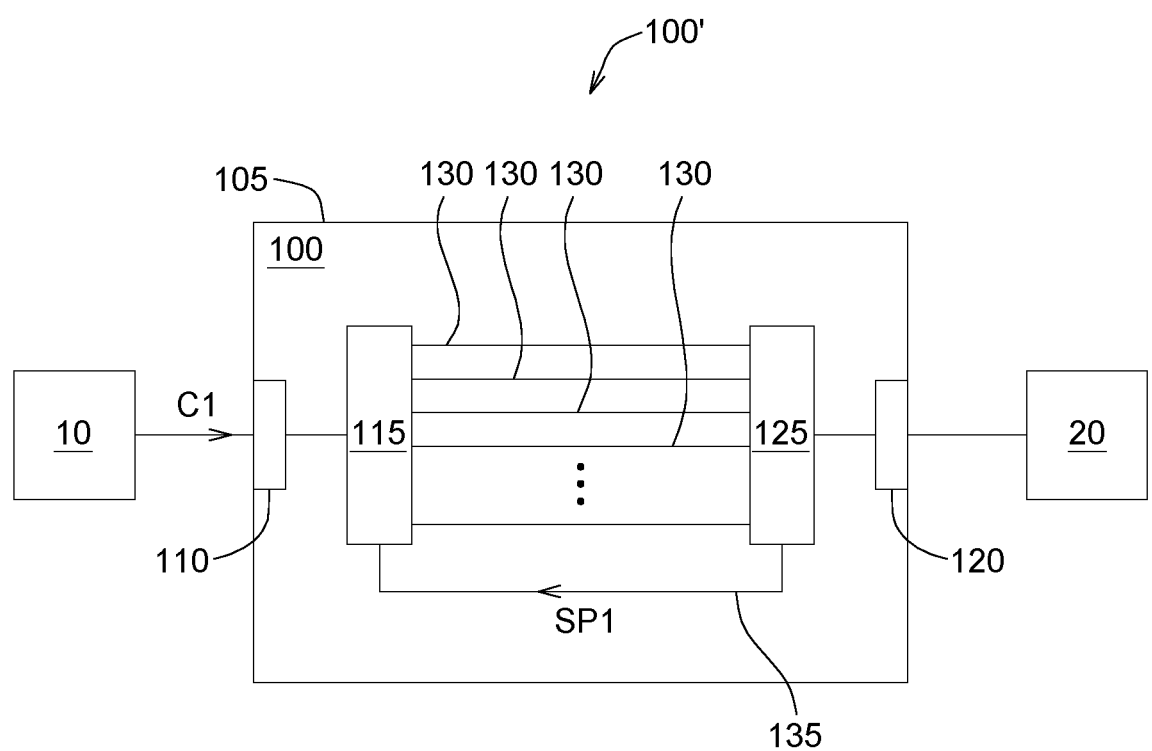
FIG. 1 is a function block diagram of an electronic device adapting system according to an embodiment of the invention.

Referring to FIG. 1, a function block diagram of an electronic device adapting system 100' according to an embodiment of the invention is shown. The electronic device adapting system 100' includes an adapter 100, a first electronic device 10 and a second electronic device 20. The adapter 100 transmits signal of the first electronic device 10 to the second electronic device 20.

In the present embodiment, the first electronic device 10 can be realized by an industrial computer, such as a point of sales (POS) terminal; the second electronic device 20 can be realized by a display screen; the adapter 100 can be realized by an input/output board (I/O board), such as a signal I/O board of the USB type-C specification. The adapter 100 can transmit a display signal of the first electronic device 10 to the second electronic device 20, which then displays the frame represented by the display signal.

As indicated in FIG. 1, the adapter 100 includes a circuit board 105, a first USB type-C connector 110, a first USB type-C controller 115, a second USB type-C connector 120, a second USB type-C controller 125, pleural USB type-C data transmission lanes 130 and a signal line 135. The first USB type-C connector 110, the first USB type-C controller 115, the second USB type-C connector 120, the second USB type-C controller 125 and the USB type-C data transmission lanes 130 are formed on the circuit board 105. The first USB type-C connector 110 electrically couples the first USB type-C controller 115. The second USB type-C connector 120 electrically couples the second USB type-C controller 125. The USB type-C data transmission lanes 130 electrically couple the first USB type-C controller 115 and the second USB type-C controller 125. Besides, the first USB type-C controller 115 and the second USB type-C controller 125 can be a circuit structure (such as a chip or a semiconductor package) formed by a semiconductor manufacturing process. The first USB type-C controller 115 and the second USB type-C controller 125 can be two elements with identical structure. The USB type-C data transmission lanes 130 can be traces formed on a substrate 105 by a semiconductor manufacturing process. In an embodiment, the number of USB type-C data transmission lanes 130 is 4. Besides, the data transmission lanes 130 refer to the lanes formed by the data transmission pins (Tx) or the data reception pins (Rx) coupled to the USB type-C. Also, according to the USB type-C specification, the number of data transmission lanes 130 is 4.

The first electronic device 10 is connected to the first USB type-C connector 110 and electrically couples the first USB type-C controller 115 through the first USB type-C connector 110. The second electronic device 20 is connected to the second USB type-C connector 120, and electrically couples the second USB type-C controller 125 through the second USB type-C connector 120.

The second USB type-C controller 125 is configured to: (1) obtain the first transmission specification supported by the second electronic device 20; and (2) transmit the first transmission specification to the first USB type-C controller 115.

The first USB type-C controller 115 transmits the first transmission specification SP1 to the first electronic device 10. The first electronic device 10 transmits a control command C1 to the first USB type-C controller 115 according to the first transmission specification SP1. The first USB type-C controller 115 further uses a corresponding number of data transmission lanes 130 according to the control command C1.

The first USB type-C controller 115 and the second USB type-C controller 125 are connected by a signal line 135 of the adapter 100. The second USB type-C controller 125 transmits the first transmission specification SP1 to the first USB type-C controller 115 through the signal line 135. Then, the first USB type-C controller 115 transmits the first transmission specification SP1 to the first electronic device 10. Since the signal line 135 is an I2C transmission line rather than a USB type-C transmission line, the transmission of the first transmission specification SP1 will not occupy the USB type-C signal transmission lanes.

Figure 2:
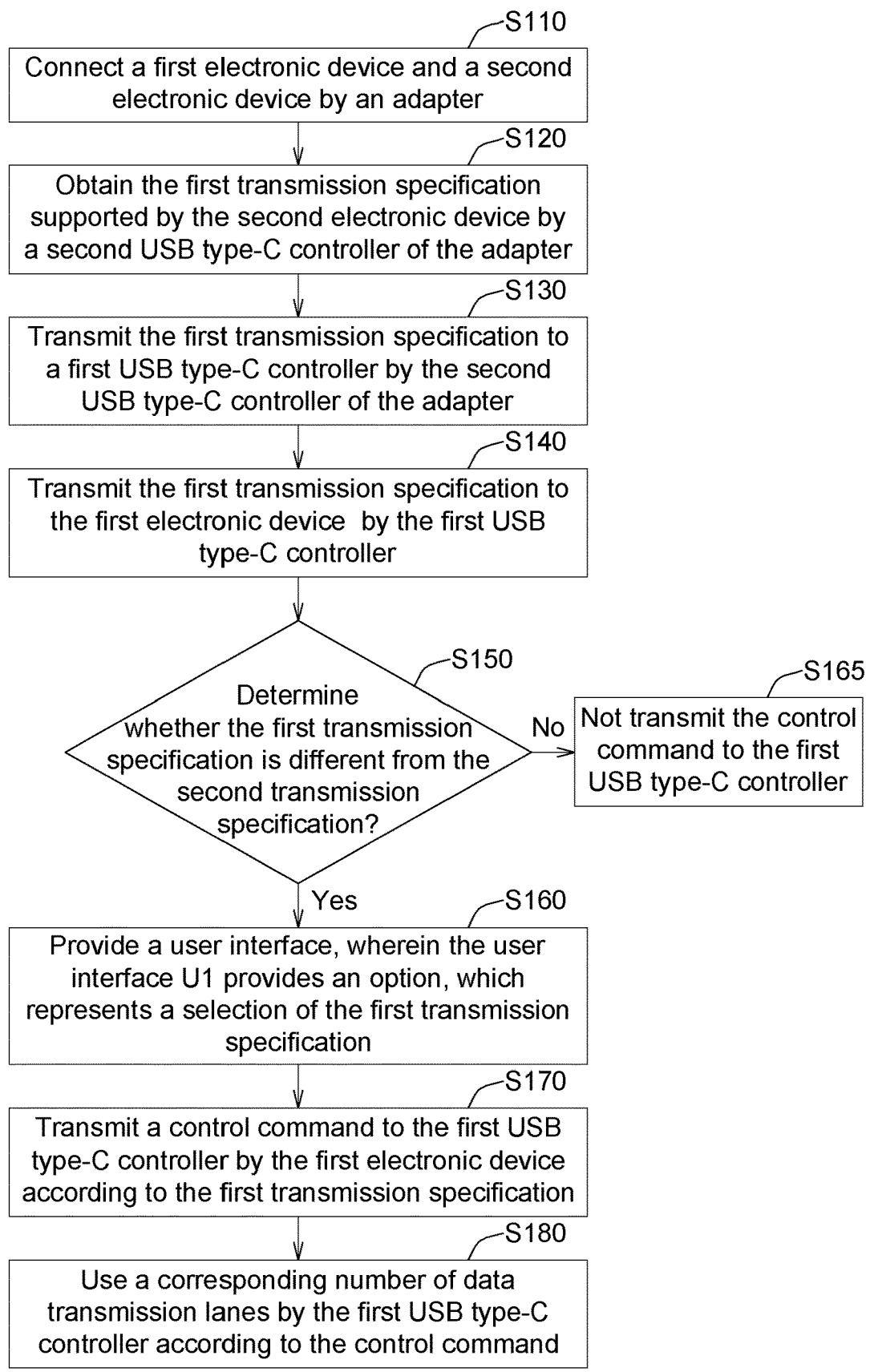
FIG. 2 is a flowchart of a signal transmission method of the adapter of FIG. 1.

The processes of the signal transmission method of the adapter 100 of FIG. 1 are explained below with accompanying drawings FIG. 2 and FIGS. 3A to 3F. FIG. 2 is a flowchart of a signal transmission method of the adapter 100 of FIG. 1. FIGS. 3A to 3F are processes of the signal transmission method of the adapter 100 of FIG. 1.

Figure 3A:
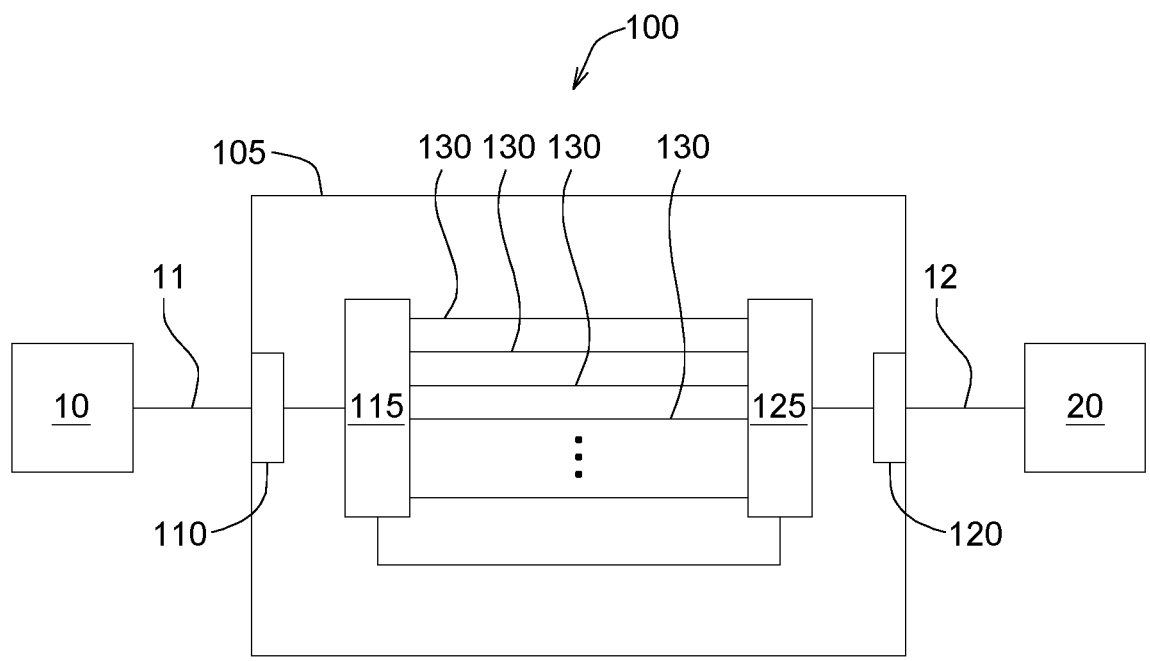
FIGS. 3A to 3F are processes of the signal transmission method of the adapter of FIG. 1.

In step S110, as indicated in FIG. 3A, the first electronic device 10 and the second electronic device 20 are connected by the adapter 100. For example, the first electronic device 10 is connected to the first USB type-C connector 110 through the first USB type-C connection line 11, and the second electronic device 20 is connected to the second USB type-C connector 120 through the second USB type-C connection line 21. Or, the first electronic device 10 itself has a USB type-C connector, and can be directly connected to the first USB type-C connector 110. Or, the second electronic device 20 itself has a USB type-C connector, and can be directly connected to the second USB type-C connector 120.

Figure 3B:
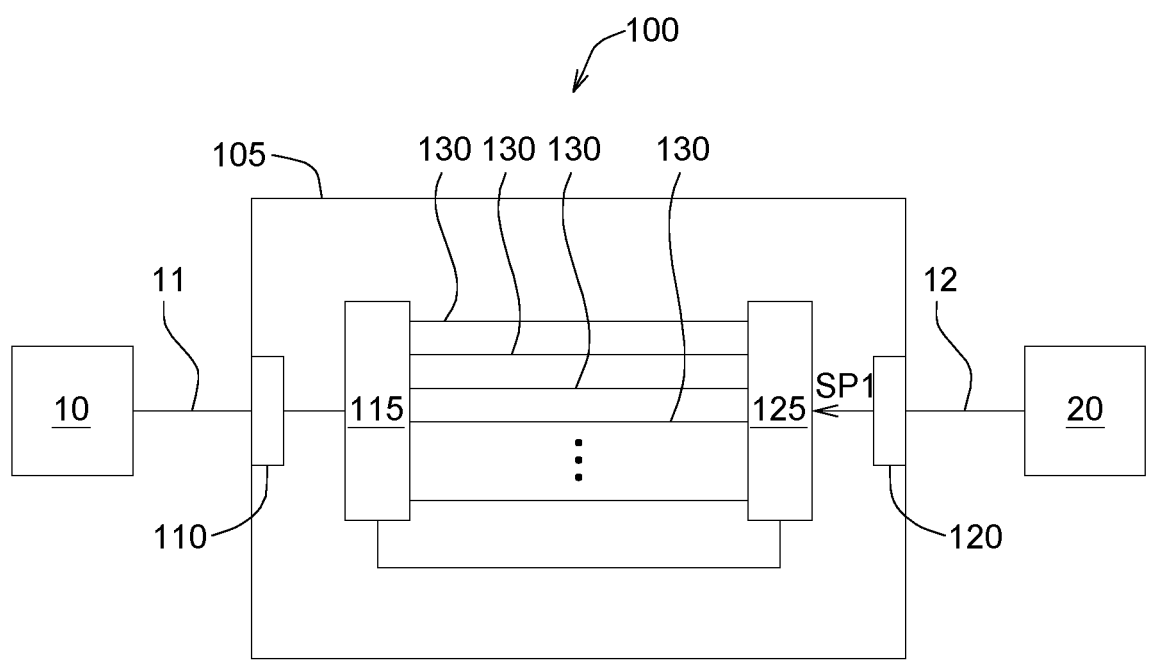

In step S120, as indicated in FIG. 3B, the first transmission specification SP1 supported by the second electronic device 20 is obtained by the second USB type-C controller 125 of the adapter 100. For example, after the second electronic device 20 and the second USB type-C connector 120 are connected, the second electronic device 20 and the second USB type-C controller 125 can communicate with each other, and the second USB type-C controller 125 can obtain the first transmission specification SP1 supported by the second electronic device 20 (the transmission specification necessary for achieving the function of the second electronic device 20). The first transmission specification SP1 is such as a transmission specification of "using four of the data transmission lanes".

Figure 3C:
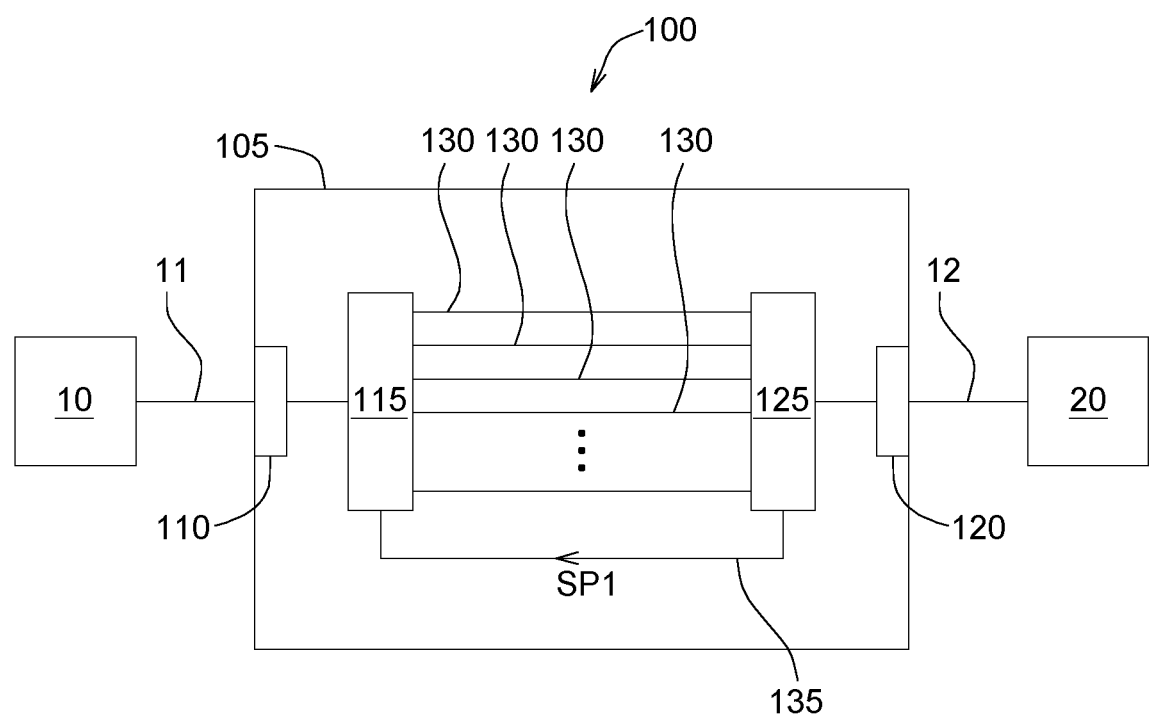

In step S130, as indicated in FIG. 3C, the first transmission specification SP1 is transmitted to the first USB type-C controller 115 by the second USB type-C controller 125 of the adapter 100. The first USB type-C controller 115 and the second USB type-C controller 125 are connected by the signal line 135 of the adapter 100. Since the signal line 135 is an I2C transmission line rather than a USB type-C transmission line, the second USB type-C controller 125 transmits the first transmission specification SP1 to the first USB type-C controller 115 through the signal line 135, and the transmission of the first transmission specification SP1 will not occupy the USB type-C signal transmission lane.

Figure 3D:
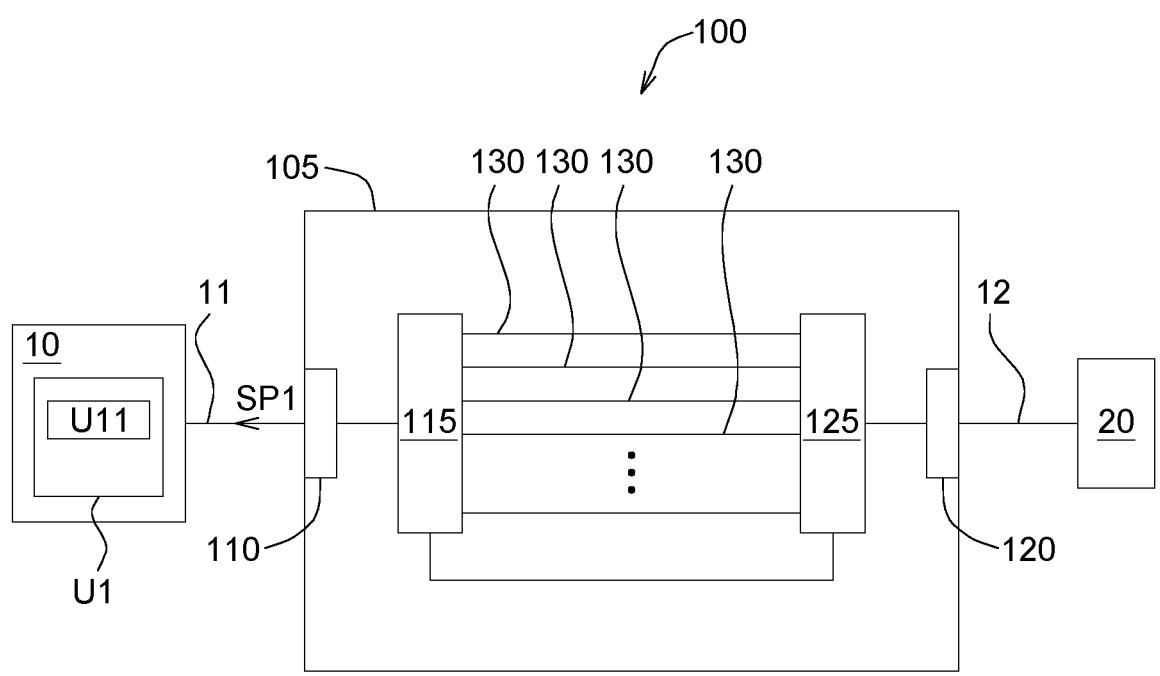

In step S140, as indicated in FIG. 3D, the first transmission specification SP1 is transmitted to the first electronic device 10 by the first USB type-C controller 115.

In step S150, whether the first transmission specification SP1 supported by the second electronic device 20 is different from the second transmission specification currently provided by the adapter 100 is determined by the first electronic device 10. If it is determined that the first transmission specification SP1 is different from the second transmission specification, the method proceeds to step S160. If it is determined that the first transmission specification SP1 is identical to the second transmission specification, the method proceeds to step S165. Specifically, the number of data transmission lanes 130 needs will be changed only if the first transmission specification SP1 is different from the second transmission specification (the result of determination in step S150 is "yes"). If the first transmission specification SP1 is identical to the second transmission specification (the result of determination in step S150 is "no"), the number of data transmission lanes 130 does not need to be changed and the control command C1 does not need to be transmitted to the first USB type-C controller 115 either.

In step S160, a user interface is provided by the first electronic device 10, wherein the user interface U1 provides an option U11, which represents a selection of the first transmission specification SP1. When the option U11 is activated (or selected), this implies that the user intends to change the number of data transmission lanes 130 to comply with the first transmission specification SP1. In an embodiment, the user interface U1 can be provided by the basic input output system (BIOS) of the first electronic device 10. In an embodiment, when the first electronic device 10 and the second electronic device 20 are connected by the adapter 100, the first electronic device 10 can automatically pop on the user interface U1.

To summarize, in step S160, a switch option U11 is provided for the user to decide whether to change the number of data transmission lanes 130 or not. When the user activates the option U11 and changes the number of data transmission lanes 130, the method proceeds to step S170. If no, the method proceeds to step S165. In another embodiment, the signal transmission method can omit step S160, and the method directly proceeds to step S170.

Figure 3E:
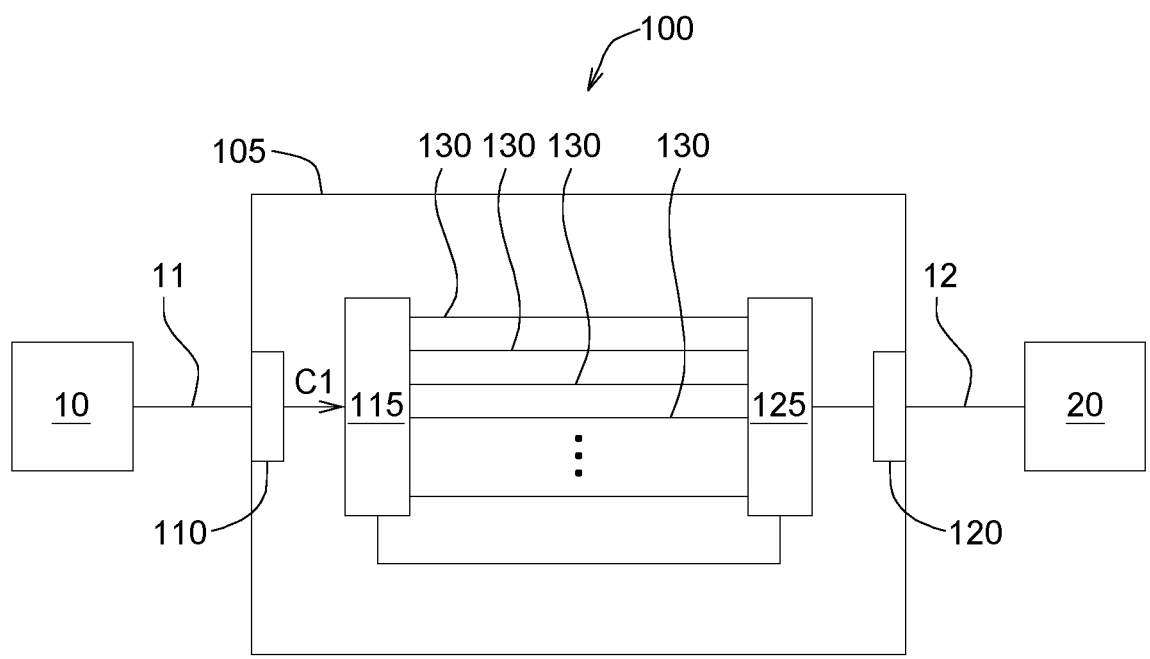

In step S170, as indicated in FIG. 3E, a control command C1 is transmitted to the first USB type-C controller 115 by the first electronic device 10 according to the first transmission specification SP1. For example, the control command C1 is transmitted to the first USB type-C controller 115 through the CC pins of the first USB type-C connector 110.

Figure 3F:
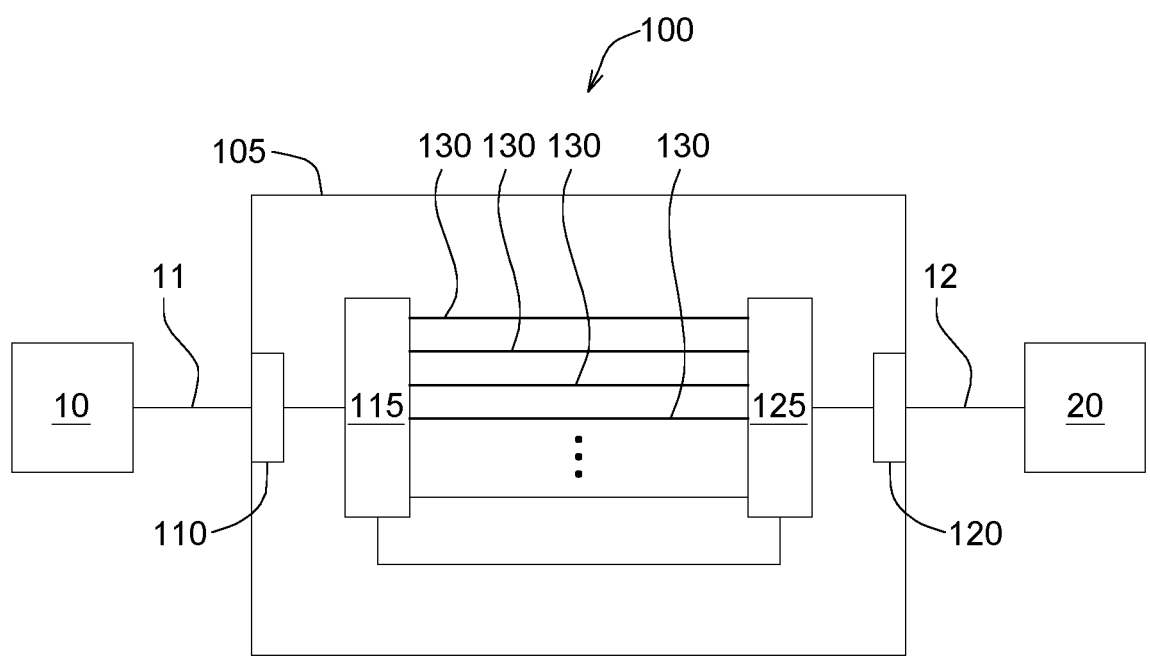

In step S180, as indicated in FIG. 3F, if the first transmission specification SP1 is different from the second transmission specification (step S150 the result of determination in is "yes"), a corresponding number of data transmission lanes 130 are used by the first USB type-C controller 115 according to the control command C1. The used data transmission lanes 130 are illustrated by bold lines.

For example, when the adapter 100 provides USB 3.0 function, only two of the data transmission lanes 130 are used, and the remaining data transmission lanes 130 can only support the FHD resolution (1920×1080, 1080p) display signal. When the adapter 100 provides USB 2.0 function, four of the data transmission lanes 130 are used, and there will be data transmission lanes to support the 4K display signal. That is, the 4K display screen can be displayed.

When the second electronic device 20 (such as the display screen) can support the 4K resolution specification, this implies that the first transmission specification SP1 of the second electronic device 20 is "using four of the data transmission lanes 130". When the second transmission specification currently provided by the adapter 100 is "using two of the data transmission lanes, this implies that the first transmission specification SP1 is different from the second transmission specification (the result of determination in step S150 is "yes"). Thus, in step S180, four of the data transmission lanes 130 are used by the first USB type-C controller 115 according to the control command C1 as indicated in FIG. 3F. The 4K display signal (data) transmitted from the first electronic device 10 can be completely transmitted to the second electronic device 20 through the four data transmission lanes 130 used by the adapter 100, such that the second electronic device 20 can display a 4K display frame.

In step S165, since the second transmission specification currently provided by the adapter 100 and the first transmission specification SP1 supported by the second electronic device 20 are identical, for example, both are "using two of the data transmission lanes" (the second electronic device 20 can only support the FHD resolution display frame), the first USB type-C controller 115 does not need to change the number of data transmission lanes 130, and the first electronic device 10 does not need to transmit the control command C1 to the first USB type-C controller 115.

In the above embodiment as indicated in FIG. 1, the adapter 100 complies with the USB type-C specification. When the second electronic device 20 supports the USB type-C specification, the second electronic device 20 can be directly connected to the adapter 100 without going through other adapters.

Figure 4:
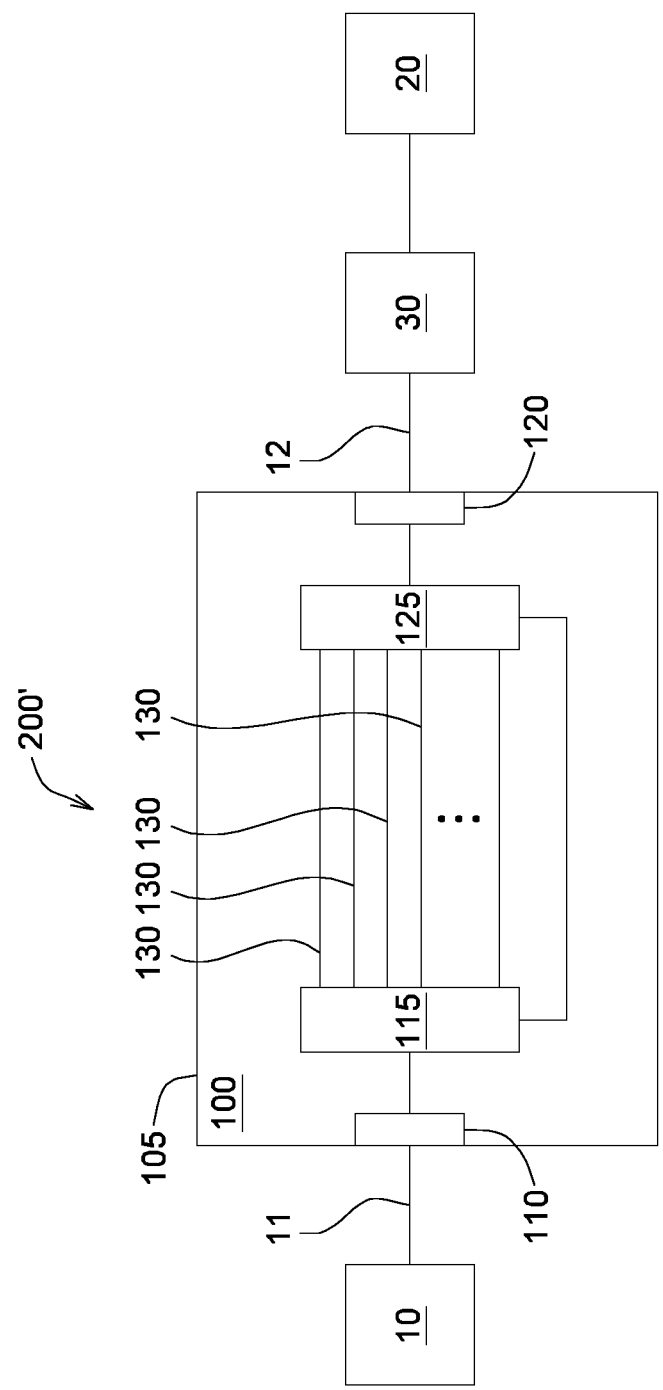
FIG. 4 is a function block diagram of an electronic device adapting system according to another embodiment of the invention.

Referring to FIG. 4, a function block diagram of an electronic device adapting system 200' according to another embodiment of the invention is shown. The electronic device adapting system 100' includes an adapter 100, a first electronic device 10, a second electronic device 20 and a third electronic device 30. The adapter 100 transmits signal of the first electronic device 10 to the second electronic device 20. In the present embodiment, since the second electronic device 20 does not support the USB type-C specification, the second electronic device 20 can be connected to the adapter 100 through the third electronic device 30. The third electronic device 30 can convert the USB type-C signal outputted from the adapter 100 into a signal whose transmission specification can be supported by the second electronic device 20. For example, the second electronic device 20 is a VGA display screen, and the third electronic device 30 is an adapter complying with the VGA specification and the USB type-C specification.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adapter configured to transmit signal of a first electronic device to a second electronic device, the adapter comprising:
a first universal serial bus (USB) type-C controller configured to electrically couple the first electronic device;
a second USB type-C controller configured to electrically couple the second electronic device; and
a plurality of USB type-C data transmission lanes connected between the second USB type-C controller and the first USB type-C controller;
wherein the second USB type-C controller is configured to: (1) obtain a first transmission specification supported by the second electronic device; and (2) transmit the first transmission specification to the first USB type-C controller;
wherein the first USB type-C controller transmits the first transmission specification to the first electronic device; the first electronic device transmits a control command to the first USB type-C controller according to the first transmission specification; the first USB type-C controller uses a corresponding number of data transmission lanes according to the control command;
wherein the USB type-C data transmission lanes are traces.

2. The adapter according to claim 1, further comprising:
a signal line connecting the first USB type-C controller and the second USB type-C controller;
wherein the second USB type-C controller transmits the first transmission specification to the first USB type-C controller through the signal line.

3. The adapter according to claim 2, wherein the signal line is an I2C transmission line.

4. The adapter according to claim 2, wherein the first electronic device is further configured to:
provide a user interface, wherein the user interface provides an option, which represents the selection of the first transmission specification.

5. The adapter according to claim 1, wherein the first electronic device comprises a USB type-C connector, and the control command is transmitted to the first USB type-C controller through the CC pins of the USB type-C connector.

6. The adapter according to claim 1, wherein the first transmission specification is "using four of the data transmission lanes".

7. The adapter according to claim 1, wherein the first transmission specification is "using two of the data transmission lanes".

8. The adapter according to claim 1, wherein the adapter provides a second transmission specification; and the first electronic device is further configured to:
determine whether the first transmission specification supported by the second electronic device is identical to the second transmission specification; and
transmit the control command to the first USB type-C controller when the first transmission specification is different from the second transmission specification.

9. The adapter according to claim 1, wherein the first electronic device is an industrial computer, and the second electronic device is a display screen.

10. The adapter according to claim 1, wherein the adapter is an input/output board (I/O board) connected to an industrial computer.

11. A signal transmission method for an adapter connecting a first electronic device to a second electronic device, the adapter comprising a first universal serial bus (USB) type-C controller, a second USB type-C controller, a plurality of USB type-C data transmission lanes connecting between the first USB type-C controller and the second USB type-C controller, and the signal transmission method comprising:
   obtaining a first transmission specification supported by the second electronic device by the second USB type-C controller;
   transmitting the first transmission specification to the first USB type-C controller by the second USB type-C controller;
   transmitting the first transmission specification to the first electronic device by the first USB type-C controller;
   transmitting a control command to the first USB type-C controller by the first electronic device according to the first transmission specification; and
   using a corresponding number of data transmission lanes by the first USB type-C controller according to the control command;
   wherein the USB type-C data transmission lanes are trace.

12. The signal transmission method according to claim 11, wherein the adapter further comprises:
   a signal line connecting the first USB type-C controller and the second USB type-C controller;
   wherein in the step of transmitting the first transmission specification to the first USB type-C controller by the second USB type-C controller, the second USB type-C controller transmits the first transmission specification to the first USB type-C controller through the signal line.

13. The signal transmission method according to claim 12, wherein the signal line is an I2C transmission line.

14. The signal transmission method according to claim 12, further comprising:
   providing a user interface by the first electronic device, wherein the user interface provides an option, which represents a selection of the first transmission specification.

15. The signal transmission method according to claim 11, wherein the first electronic device comprises a USB type-C connector; in the step of transmitting the control command to the first USB type-C controller by the first electronic device, the control command is transmitted to the first USB type-C controller through the CC pins of the USB type-C connector.

16. The signal transmission method according to claim 11, wherein the first transmission specification is "using four of the data transmission lanes".

17. The signal transmission method according to claim 11, wherein the first transmission specification is "using two of the data transmission lanes".

18. The signal transmission method according to claim 11, wherein the adapter provides a second transmission specification; and the signal transmission method further comprises:
   determining whether the first transmission specification supported by the second electronic device is identical to the second transmission specification; and
   transmitting the control command to the first USB type-C controller when the first transmission specification is different from the second transmission specification.

19. The signal transmission method according to claim 11, wherein the first electronic device is an industrial computer, and the second electronic device is a display screen.

20. The signal transmission method according to claim 11, wherein the adapter is an I/O board connected to an industrial computer.

* * * * *